United States Patent [11] 3,590,637

| [72] | Inventor | William R. Brown |
| | | 2756 N. Lexington Parkway, Saint Paul, Minn. 55113 |
| [21] | Appl. No. | 882,405 |
| [22] | Filed | Dec. 17, 1969 |
| [45] | Patented | July 6, 1971 |
| | | Continuation of application Ser. No. 630,855, Apr. 14, 1967, now abandoned. |

[54] FLOW METER
21 Claims, 20 Drawing Figs.
[52] U.S. Cl. ............................................................ 73/212
[51] Int. Cl. ............................................................ G01p 5/16
[50] Field of Search .......................................... 73/205, 212

[56] References Cited
UNITED STATES PATENTS

| 2,260,019 | 10/1941 | Gentile | 73/212 |
| 2,605,639 | 8/1952 | Gentile | 73/272 |
| 3,355,946 | 12/1967 | Lazell | 73/212 |

Primary Examiner—Richard C. Queisser
Assistant Examiner—John K. Lunsford
Attorney—Paul & Paul ABSTRACT: A ring-shaped differential-pressure-producing flow meter adapted to be inserted into a pipeline, the body portion having an internal diameter corresponding to that of the pipeline. One or more pressure-generating forms extend from the inner circumference of the body beyond the boundary layer of fluid flowing through the body. A piezometer tap is positioned in pressure-sensing relation to the pressure-generating forms.

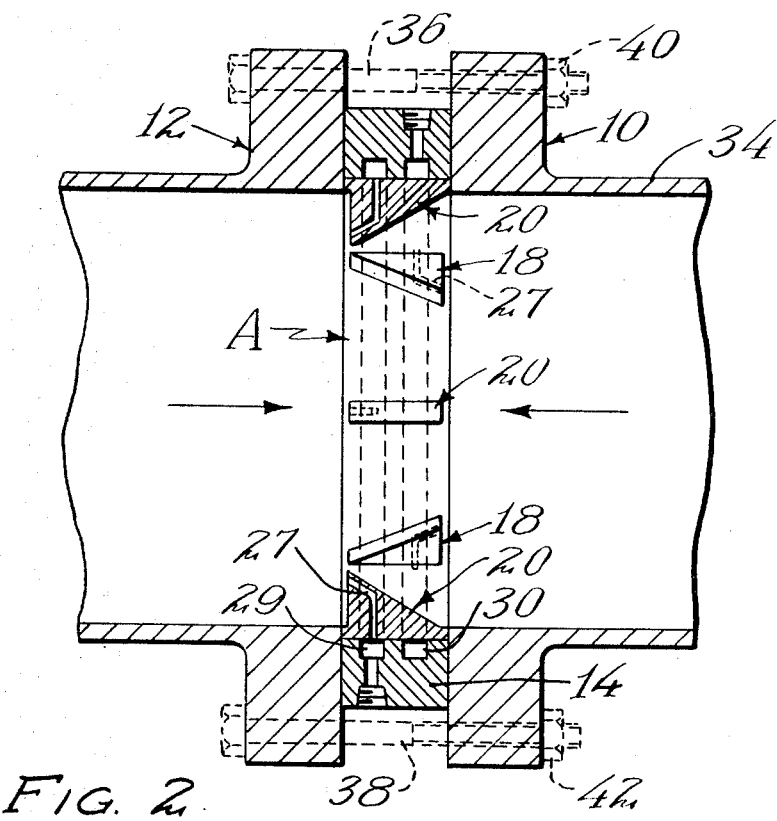
FIG. 2
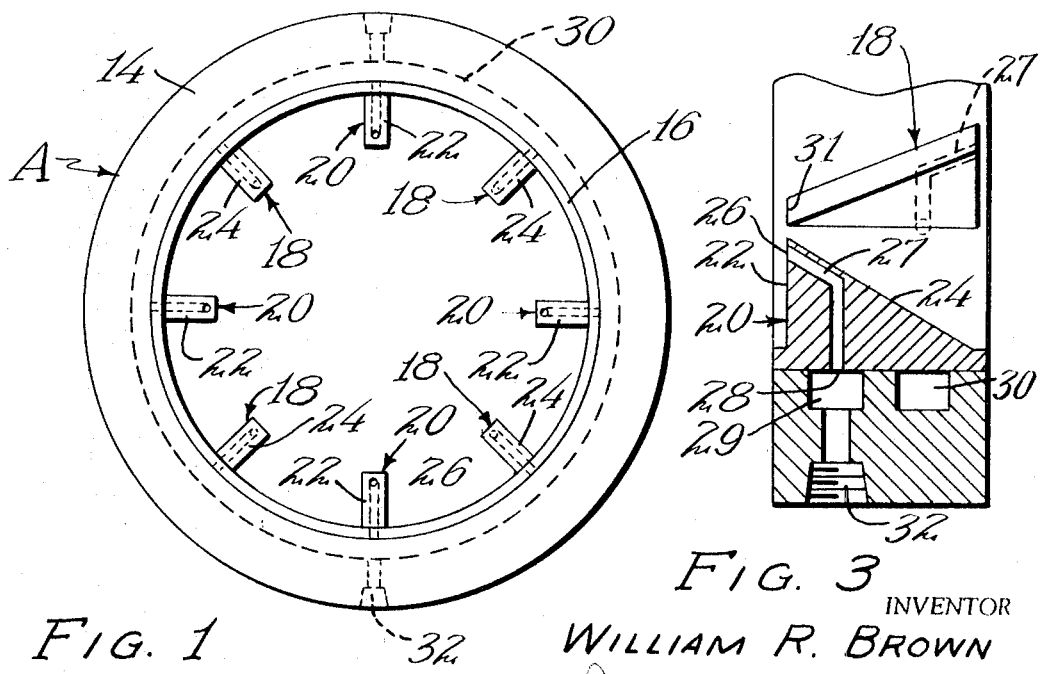
FIG. 1
FIG. 3
INVENTOR
WILLIAM R. BROWN
BY *Weldon Dunning*
ATTORNEY

COMPARATIVE OVERALL LENGTHS 8 INCH DIAMETERS

INVENTOR
WILLIAM R. BROWN

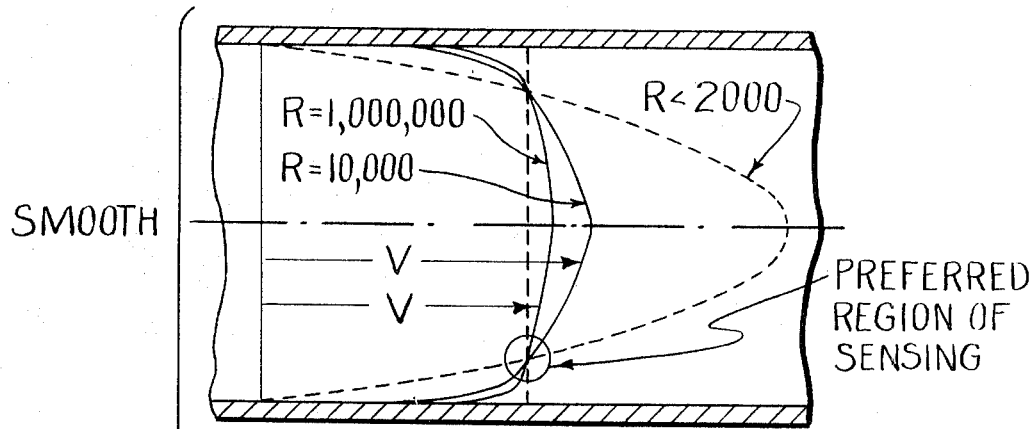
FIG. 6
FIG. 6a
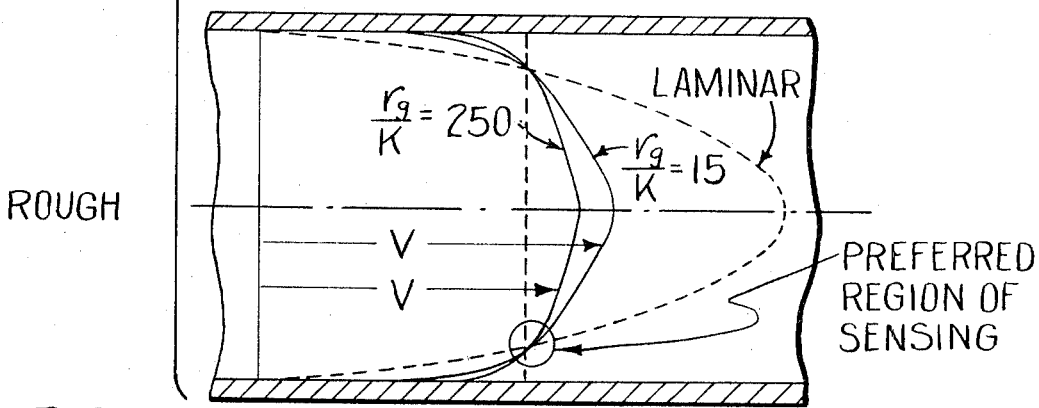
TYPICAL CURVES OF VELOCITY DISTRIBUTION IN SMOOTH AND ROUGH PIPES
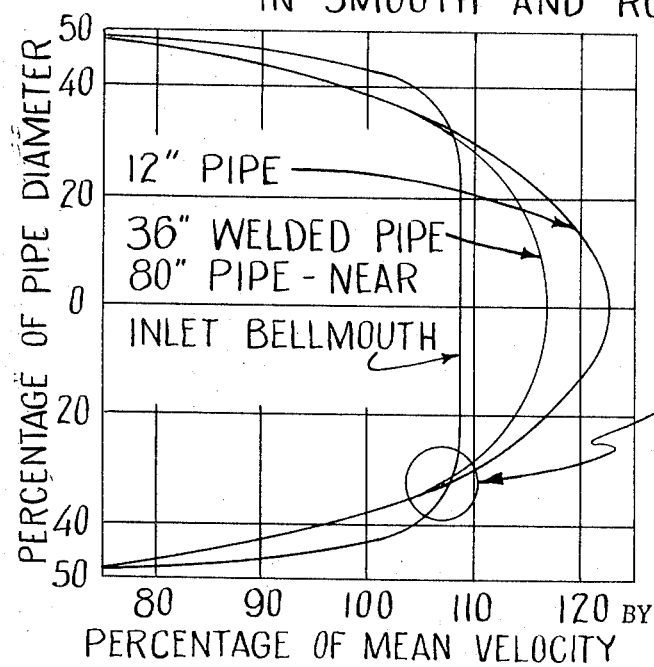
VELOCITY DISTRIBUTION CURVES
FIG. 7
INVENTOR
WILLIAM R. BROWN

INVENTOR
WILLIAM R. BROWN

FLOW METER

CROSS-REFERENCE TO RELATED APPLICATION

This application is a continuation of U.S. application Ser. No. 630,855 filed Apr. 14, 1967, now abandoned.

SUMMARY OF THE INVENTION

This invention relates to a differential-pressure-producing flow meter for use in measuring fluid and gas flow.

It is an object of the present invention to provide a flow meter equally satisfactory for measurement of fluid regardless of the direction of flow. It will be understood that fluid encompasses gas as herein used.

It is a further object of the present invention to provide a flow meter adapted to be used for the measurement of fluid flow and additionally for the introduction of secondary fluids into a primary stream of flow.

Generally, conventional long-form venturis, compact venturis and Orifice plates are recognized as providing optimum performance when their performance characteristics correspond to certain advantageous conditions. It has been generally accepted that if a stable coefficient over a wide operating range, excellent accuracy, and ability to handle solids-bearing liquids is required, the long-form venturi is used. If higher differentials, shorter overall length and lower head losses calculated as a percent of differential are to be the primary considerations, compact-type tubes are used. If the magnitude of unrecovered head loss is not an important factor and the flat-type section producing the constriction is not objectionable for the fluid being measured, Orifice plates are commonly used.

The above factors are the primary criteria used in determining performance of the pressure-differential-producing-type tubes, venturis and Orifice plates, and these criteria also apply to so-called venturi meters and Orifice meters.

For purposes of comparison reference is made at this point to magnetic-type flow meters, which measure the mass flow rates of various liquids, for the reason that coefficient stability, head loss, accuracy, overall lengths and ability to handle solids-bearing liquids are also criteria for their design.

The coefficient value of constricted-type meters and Magnetic Meters is a factor which indicates the deviation of actual flow from a perfect frictionless flow. With varying flows and velocities, the corresponding Pipe Reynolds number will decrease to a value at which there is a deviation from a normally straight line coefficient curve. The point at which the coefficient deviates from a straight line condition indicates that inaccuracy of flow measurement in a standard secondary instrument will occur, and the greater the deviation the greater the inaccuracy of measurement will be. This deviation point is therefore a limiting factor which establishes the range over which a constriction-type meter can be used accurately with a standard secondary instrument. Therefore, to prevent the metering range of a constricted-type meter from being reduced to that breakup point on the coefficient curve, commonly with tubes of current design and particularly with high-differential low-loss type, it is necessary to move the measuring or metering range up to a higher Pipe Reynolds number on the straight or flat portion of the coefficient curve. This is accomplished by either decreasing the throat diameter of the venturi tube, which in turn decreases the Beta Ratio, or by compensating for the deviations in the secondary instruments. It will be recognized that if the Beta Ratio is decreased, the velocity increases providing a favorable increase in pressure differential, but, a very unfavorable increase in overall head loss. It will be further recognized that modifications or compensations to be made in secondary instruments are quite costly and normally require a customized instrument.

It will be further recognized that constricted-type meters have inherent limitations which impose restrictions on their performance. The discharge coefficient deviates from a constant value depending on the main size of tube. The length may be from three to seven times as long as for the compact type and there normally results a head loss from 10 to 25 percent of the differential. In certain instances it is possible to provide a relatively constant coefficient down to Reynolds numbers of approximately 120,000 but this appears to be the limit of performance.

For high-differential low-loss compact-type tubes the lower limits of coefficient flatness are reached at Pipe Reynolds numbers from approximately 120,000 to 350,000. The coefficients become unstable at Pipe Reynolds numbers below these figures. Head loss produced by the compact high differential tubes is considerably less than that of the conventional long-form tubes. This ranges from 4 to 7 percent of the differential. The overall length of a compact tube is approximately one-third of a conventional long-form tube, however, the compact tubes are more sensitive to upstream environmental conditions. Some of these tubes are subject to plugging of throat slots and main piezometers, and in certain instances they are sensitive to alignment conditions within the Pipe diameter. Venturi-type differential-pressure-producing devices must obtain their low-pressure measurement in the flat velocity profile created by the convergent and throat sections. These devices must also use a divergent downstream section to effect partial recovery of head lost in these sections. The constriction and geometry of these tubes, particularly the compact tubes, is designed to produce higher differentials. Head loss is then calculated as a percentage of these differentials which provides a good head loss "picture." However, modern low-Differential Pressure Converter Transmitters do not require the higher differentials for highly accurate operation of secondary instrumentation. Further, the compact tubes of high Beta Ratio are very sensitive to upstream conditions and inaccuracies are caused by deviations from the normal coefficient value and from the flat characteristic of the curve. As a result producers of tubes tend to utilize tubes having Beta Ratio of approximately 0.5.

While the coefficient value of my invention is lowered if it is installed downstream of an elbow, for example, the flat characteristic of the coefficient is maintained. Therefore, stability is not affected and tests prove it is possible to accurately predict the coefficient value at any distance from the elbow which permits installation of my ring meter immediately downstream of the elbow without any length of straight pipe preceding it. Thus, both measurements and secondary instrumentation functions are accurate.

It is an object of the present invention to provide a ring meter having none of the limitations previously described and which may be used to perform the functions of an orifice plate, a flow nozzle, a long-form venturi and the compact venturi.

It is a further object of my invention to provide a ring meter which provides a stable and unique differential-pressure-measuring device and produces a net head loss lower than other known differential-pressure-producing devices such as venturis, compact tubes, and orifice plates.

I provide a meter having an internal configuration in the preferred construction in the form of an annulus or ring having spaced pressure or signal generating forms extending into the interior of the ring to produce positive and negative pressures. This eliminates constriction of the tube section found in conventional devices.

I have found that for an 8-inch-size meter that there is a net or actual loss of from 0 percent to only 1.5 percent over a flow range of approximately zero flow to approximately 1,000,000 Pipe Reynolds number. This is far below true value of other devices presently known. For example, this may be compared with the approximately 12 to 16 percent loss for a long form venturi, to an approximately 5 percent loss for a compact tube, and to an approximately 70 percent loss for an Orifice plate. These losses are stated as a percentage of inflated differentials. A comparison of 8-inch flow meters may be seen in FIG. VIII.

It is a further object of my invention to provide a substantially flat ring-type differential-pressure-measuring device which has an overall length of approximately 7 percent of the normal long-form flanged venturi and approximately 16 percent of the overall length of an insert-type compact, low-loss venturi tube. Accordingly, it is apparent that it is an object of my invention to provide a differential-pressure-measuring device of substantially minor length which can be installed in the customer's pipe wherever required or desired.

It is a further object of my invention to provide a differential-pressure-measuring device capable of measuring a reversal of flow with a change of sign but without a change of coefficient value.

My meter preferably is comprised of any suitable material or combination of materials such as brass, stainless steel, iron, steel, and various plastics so as to be substantially free from maintenance requirements and noncorrosive.

Additionally, it is an object of the present invention to provide a ring meter capable of utilizing where desired modified shapes of pressure or signal generating forms, and where desired variation as to the location of the piezometer taps.

DESCRIPTION OF THE DRAWINGS

These and other objects and particular advantages will be more particularly described and detailed in the accompanying specification taken in conjunction with the drawings herein in which:

FIG. 1 is a view taken through the ring meter showing the spaced relation of the generating forms.

FIG. 2 is a view of a meter secured in a fluid-conducting pipe illustrating high and low pressure forms.

FIG. 3 is an enlarged section showing the forms of FIG. 2 and the piezometer tap.

FIG. 6 is a curve of velocity distribution in smooth pipes.

FIG. 6A is a curve of velocity distribution in rough pipes.

FIG. 7 is curves of velocity distribution in large and small pipes.

DESCRIPTION OF THE INVENTION

Figure 4:
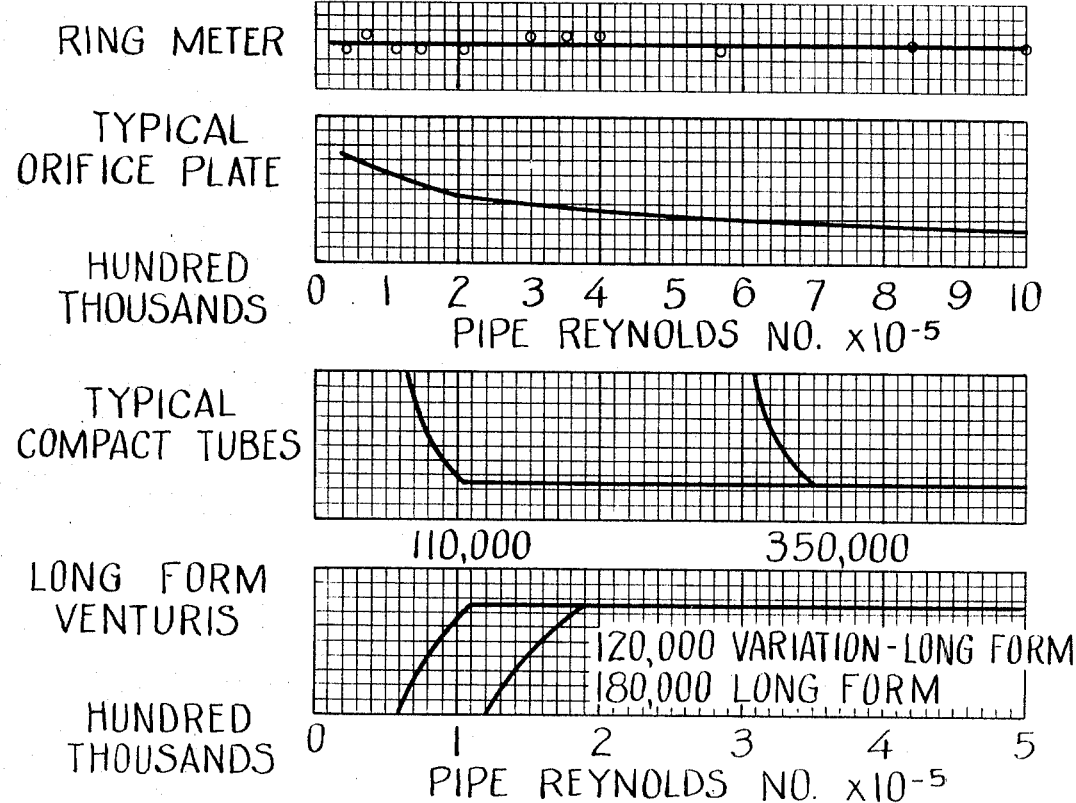
FIG. 4 illustrates coefficient curves of typical commercial flow-measuring devices in comparison with the coefficient of the present invention.

In the drawings FIG. 1 illustrates a sandwich-type ring to provide a pressure-differential-producing meter generally lettered A.

In FIG. 2, the meter A is shown mounted between a pair of pipe flanges 10 and 12. Arrows in the drawing indicate fluid-flow direction.

The meter A is in preferred construction a metal ring 14 having an unobstructed inner surface as a bushing or liner 16. Any suitable material may be used for the ring, for example, metals such as steel, iron or brass may be used, inactive synthetics, and combinations of metal and synthetics are similarly suitable. Obviously, the choice of material to be used will be influenced by the characteristics of the fluid to be carried in the pipe.

The bushing 16 can be made from brass or bronze, stainless steel or noncorrosive metal or inert plastic.

I provide a series of pressure-generating forms extending inwardly from the interior circumference of the ring 14, the forms being numbered 18 and 20. The forms 18 and 20 preferably are of a substantially identical dimension, a preferred construction being illustrated in FIG. 3.

In the pressure-generating form illustrated in FIG. 3, the form is generally triangular and has a leading or face surface 22 and a trailing surface 24. A piezometer tap 27 extends through the form having a sensing opening 26 and a takeoff opening 28. The form preferably has its face side normal to the interior circumference of the ring.

In preferred construction the forms alternately face upstream and downstream. The forms are of similar size and shape and differ only in the direction in which they are positioned relative to the direction of fluid flow. As illustrated, the form may be generally a right triangle with the face side of the form or ramp 20 directed into the path of flow or with the face side of the forms 18 directed away from the direction of flow.

In the construction illustrated, the piezometer tap or hole 27 extends substantially parallel to the hypotenuse of the right triangle or trailing surface 24 for a substantial distance and then angles obtusely toward the outer surface of the ring.

In preferred construction the pressure generators 20 facing upstream produce identical differentials with the downstream facing generators 18 when the flow reverses direction due to the identical dimensions and symmetry of the generators.

The forms have an effective height such that the openings are beyond the effects of the viscous boundary layer at the inside wall of the pipe. Preferably, the piezometer opening 26 is in the preferred region of relatively constant velocity as determined by calculations, tests and technical data published by various sources. See FIGS. 6, 6A and 7.

In the preferred construction eight pressure-generating forms are utilized with four forms facing upstream and four forms facing downstream. The forms are alternately faced and equally spaced around the interior circumference of the ring. This relationship is apparent in FIG. 1. A pressure-averaging annulus or chamber 30 communicates with the forms. A pressure-takeoff fitting 32 communicates with the averaging chamber, the fitting 32 being adapted to be connected to a secondary recording instrument (not shown).

It will be understood that the layer of flow adjacent to the boundary provided by the pipe is subject to variation. The velocity distribution or profile in a straight conduit varies from zero velocity values at the pipe wall to maximum values at the center. The shape of the profile is not a constant, differing even for the same discharge in two pipes of the same diameter if the wall roughness or fluid viscosity differ. The velocity distribution differs also as a function of the diameter and of the discharge or main velocity. Such velocity distribution curves have been well publicized. See FIG. 7. The first 15 percent of the radius of flow is not only low in velocity but is subject to the variation previously described. Mounting a dynamic pressure-sensing device in this boundary region will therefore lead to signals which are weak and also subject to variations in relation between pressure and mean velocity as the character of the flow changes.

Generally, I have found that at a distance from the boundary of about 20 to 25 percent of the radius, the relation between the local velocity and the mean velocity is very nearly constant and the local velocity is very nearly equal to the mean velocity. This, therefore is the preferred region for the location of the dynamic pressure signal generator. This preferred region is subject to some variation even for straight pipes. It is subject to greater variations for metering elements mounted near pipe fittings. These variations encountered in straight pipes are compensated for by the averaging action of the inclined upstream face of the pressure generator. Variations are also compensated for or averaged by manifolding the signals of several sending elements disposed around the periphery of a section.

Since stability of signal is best in the preferred region, the effective portions of a generator must be exposed only in this region to the velocities. By mounting sensing generators beyond the thin boundary layer, they are largely isolated from the viscous sensitivities of the boundary layer and accordingly yield quite stable characteristics. The metering coefficients are found to be stable to extremely low values of the Reynolds number in some cases to approximately zero flow.

While understanding that the direction of flow may be reversed, for purposes of description it will be presumed that the upstream-facing ramp provides dynamic pressure while the downstream-facing ramps indicate negative pressure or readings.

The generators are designed to achieve a maximum stable differential pressure signal value. This differential is considered as being derived from two rather independent actions. The first action centers around the high-pressure generator while the second action centers around the low-pressure generator.

Positive dynamic pressure having a value or pressure coefficient ranging from 0 to 1 times the local velocity head is developed by the high-pressure generator. The form constituting the positive pressure generator is such that a maximum pressure coefficient results even though the angle of the approach flow deviates substantially from the normal center line values. This provides substantial stability to the coefficient even under widely varying conditions of flow turbulence.

It will be understood that all body forms possess a frontal stagnation point, but those with relatively flat fronts are in general less sensitive to directional measurement. This assumption is borne out in aerodynamic literature which indicates that discs, squares, rectangles, and forward-facing cups are in form characteristics suitable for high-pressure generators.

Low-pressure generation is usually achieved either in regions of marked boundary curvature accompanied by high local velocities or is achieved in the wake of the bodies of blunt frontal form. It has been found that relatively high values of the negative dynamic pressure coefficient may be achieved by locating the piezometer taps in boundary regions of strong curvature, but the stability of the coefficient is very sensitive to flow alignment, body form, and viscosity conditions. However, these sensitivities are practically eliminated if the body wake is employed and if the front of the body is sharp edged.

Such generators may be used with the perpendicular working face presented either upstream or downstream to produce either positive stagnation values or negative dynamic pressures. Thus it is understood that paired generator units are capable of providing substantial differential signals. The magnitude of the differential provided depends to a certain extent on the location of the piezometer taps. Substantially greater differential value is derived by the two-dimensional sharp-edged form of considerable length or aspect ratio. This form increases the negative pressure coefficient to about 1.4 or a differential pressure value of about 2.4 $V^2/2$.

As may be observed, the paired generators are symmetrical with respect to upstream and downstream flows and are thus capable of measuring a reversal of flow with a change of sign, but without a change of coefficient value. Preferably, the forms are mounted on the insert ring between the pipe flanges 10 and 12.

Returning to FIG. 2 it will be observed that the ring meter A is positioned in a pipeline 34, the ring 14 being secured between flanges 10 and 12 which are held together by any suitable means such as bolts 36 and 38 and nuts 40 and 42. Generators alternately faced into or from the direction of flow numbered 20 and 18 respectively are equally spaced about the interior of the ring 14. Piezometer taps 27 having a sensing end and outlet end communicate with pressure chambers 29 and 30.

As has been previously mentioned the sensing opening of the tap 26 is positioned above the boundary layer. Therefore, the generators are of a size so as to extend above the boundary layer at the sensing opening and to be beneath the boundary layer at their other end 31. Obviously gaskets or packing members may be utilized to provide a fluidtight fit of the ring in the pipeline 34.

As will be observed from the drawings, the average breakup point of the long-form venturi is approximately 130,000 Pipe Reynolds number. Some variations of this type tube provide a breakup point of approximately 120,000. This represents the ultimate for the long-form venturi. Breakup points for the typical compact tubes range from approximately 110,000 to 350,000 Pipe Reynolds number. The breakup point for a typical 8-inch Orifice plate is as high as 1,000,000 Pipe Reynolds number. As will be observed in FIG. 4, the coefficient curve of my invention is perfectly flat throughout the entire range. This represents the ultimate adherence to a truly exponential curve characteristic. The maximum deviation of reading is approximately plus or minus one-fourth of 1 percent.

Typical head loss curves indicate that the unrecovered head loss for an Orifice plate ranges from 40 to 95 percent maximum differential pressure. Head losses for the typical long-form venturis and the typical modified venturis range from 10 to 30 percent of the differential depending on size, beta ratio, and other factors.

The typical 8-inch compact, high-differential, low-loss venturi produces from 3 to 8 percent of the differential. The present invention produces from 0 to a maximum of 1.5 percent of the differential head. The obvious superior attributes of my invention are therefore apparent.

Figure 5:
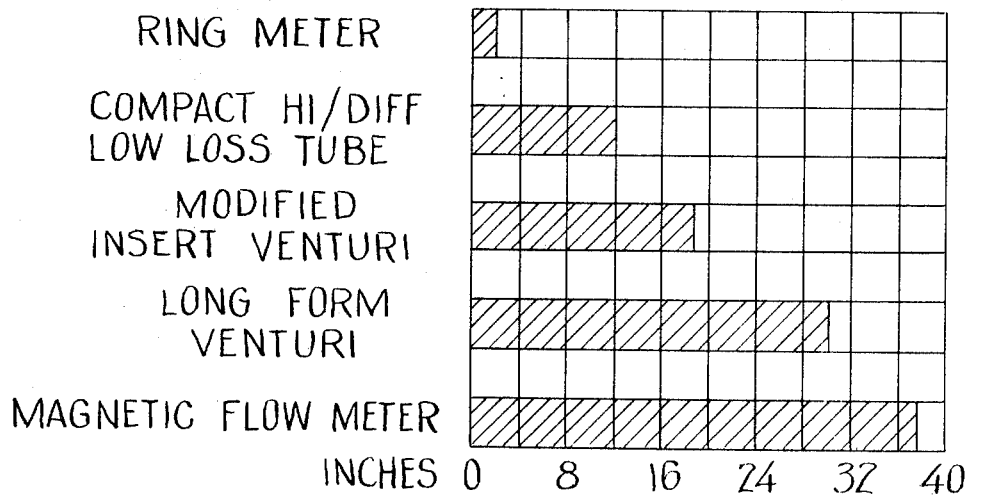
FIG. 5 illustrates the comparative overall length of a typical long-form venturi, a typical compact venturi, a magnetic flow meter and the present invention.
Figure 8:
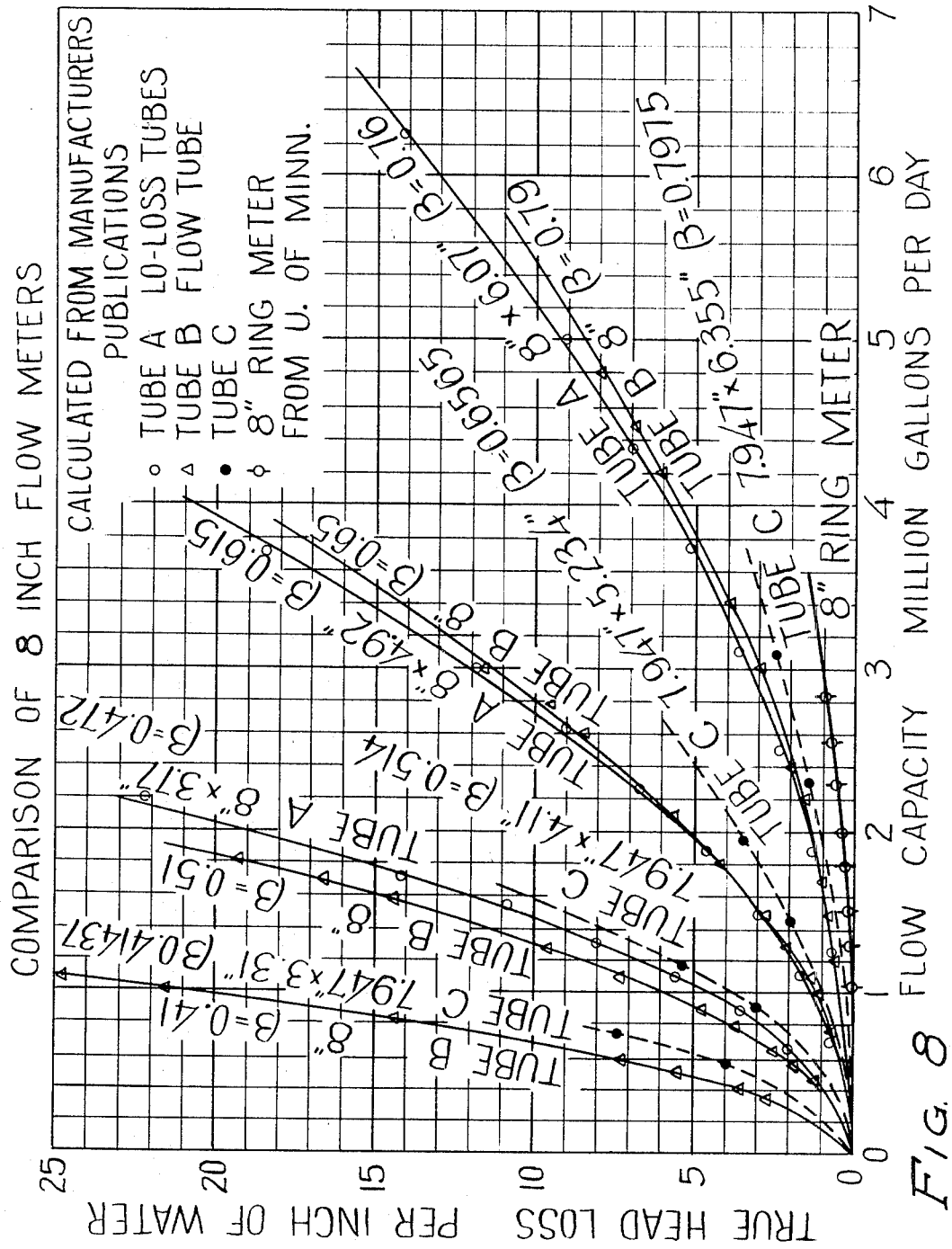
FIG. 8 is a comparison of 8-inch flow meters with the present invention, calculations of identified commercial tubes being made from publications of the manufacturers, data for the present new novel invention being taken from actual tests.

FIG. 5 illustrates the approximate lengths of typical 8-inch commercial differential-pressure-measuring devices which range from 12 inch to 37½ inches. The length of the 8-inch-diameter ring meter is approximately 2 inches and if the pressure-generating forms are considered to be in the pipe line, the overall length is 0 inches.

The size dimensions of the signal generator in the radial direction may be described as follows:

1. The exposed area is radially small in order to maintain reasonably small variations of velocity within its effective height.
2. The exposed area or height is reasonably small in order to keep the total head loss of the meter extremely small.
3. The exposed height is sufficient to accommodate forward or rear facing piezometer taps of approximately ⅛-inch diameter.
4. The total height of the generators should be approximately 0.25 times the pipe radius or 1 inch for an 8-inch pipe.
5. The piezometer hole opening location should be approximately 0.8 (0.25×r) where r equals radius of pipe.

It will be apparent that the signal generators contribute only a very minute head loss to the total flow. Such loss is too small to be practically measurable in the conventional meter-testing system. The head loss of the generators can be approximated by employing standard aerodynamic drag data for similar geometric forms.

Standard data have employed a coefficient $C_d$ which is given by the conventional equation for constriction type meters as follows:

$$Q = C_d A \sqrt{2gh} \quad \sqrt{1/(1-B^4)}$$

where $Q$ = Discharge in CFS
$A$ = Pipe area in square feet
$H$ = Meter differential in feet of water
$B$ = Diameter ratio of constricted throat to main diameter Therefore, it is apparent my invention does not include a constriction in the conventional sense, and that therefore, B is equal to unity for all sizes and the conventional equation does not apply. Thus, the simplified equation applying to my invention may be stated as follows:

$$Q = C'd A \sqrt{sgh}$$

It will thus be apparent that the present invention represents a marked step and departure from conventional methods of measuring and calculating fluid flow.

As a result of having beta value of unity, the CD or coefficient value for all sizes is constant. For example, the coefficient value for an 8-inch-size ring meter is 0.806 and should be approximately 0.807 for an 18-inch ring meter.

Figure 9:
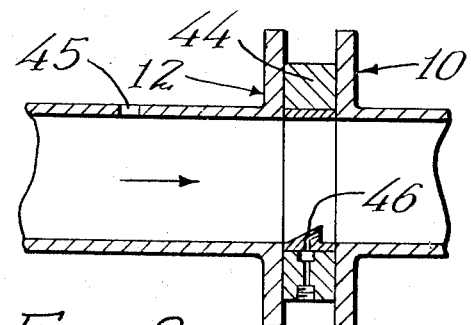
FIGS. 9—17 are modifications of the present invention as to shape of the forms, location of piezometer taps, and the positioning of the forms in the meter, the figures being unidirectional as to flow.

FIGS. 9 through 17 illustrate modified structures. In FIG. 9, I provide a ring meter 44 having a single pressure form 46, direction of flow being indicated by the arrow. This modification would be used for flow in only one direction.

Figure 10:
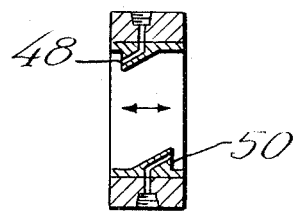

FIG. 10 illustrates a ring meter having a pair of opposed forms alternately faced, the meter forms being numbered 48 and 50. Flow obviously could be in either direction as indicated by the arrows.

Figure 11:
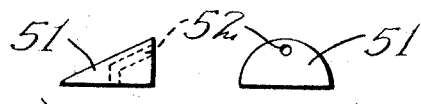

FIG. 11 illustrates one shape of a generating form in side and front elevations, the piezometer location being shown in dotted outline and numbered 52, the form being numbered 51.

Figure 12:
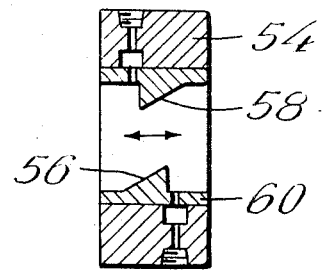

FIG. 12 illustrates a ring meter 54 having a pair of forms 56 and 58, the piezometer opening being in the ring liner 60 rather than in the forms as in FIG. 10.

Figure 13:
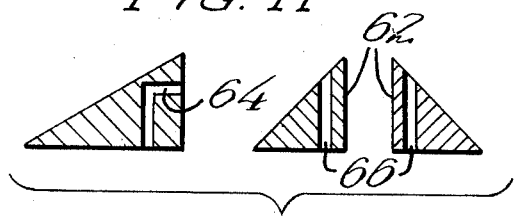

FIG. 13 illustrates a variation in piezometer in a form 62, the piezometer 64 having a substantially right-angled shape. A straight piezometer is illustrated numbered 66 in a pair of forms 62 which are particularly easy to clean by forcing a rod through the piezometer opening.

Figure 14:
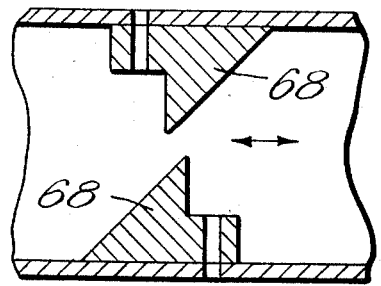

The forms 68 illustrated in FIG. 14 provide another variant for use in the ring meter.

Figure 15:
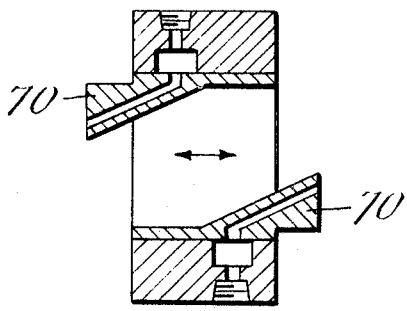

FIG. 15 illustrates forms 70 designed to extend into adjacent pipe portions.

Figure 16:
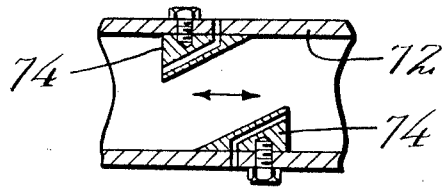

FIG. 16 represents a pipe segment 72 having pressure generators 74 which may be secured as by bolting, welding, or by any suitable means to adjacent pipe segments (not shown) in a manner which will be understood.

Figure 17:
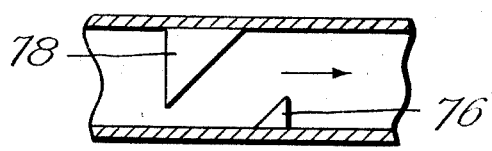

FIG. 17 provides an illustration in which the negative generator 76 is smaller than the positive ramp 78.

As may be observed in FIG. 9, if main pressure taps 45 were taken from or located in the customers pipe upstream (12) of the ring meter 44, the ring meter 44 would then only include from one to four negative-pressure generators which would face downstream. Such construction would be of advantage with sewage flow.

In FIG. 10 where using one positive and one negative generator as illustrated, averaging chambers could be eliminated.

In summation, my invention produces a constant coefficient value regardless of size, has a beta value of 1, has no throat or constriction in the conventional sense, senses flow at the point of relatively constant velocity regardless of the profile of the velocity curve, has no convergent or divergent sections, but could be accurately described in terms of being a differential producer having a higher rate of recovery or lower true head loss than any known differential-producing device, and a device which does not have to rely on inflated differentials to insure satisfactory operation of the secondary instrumentation.

Figure 18:
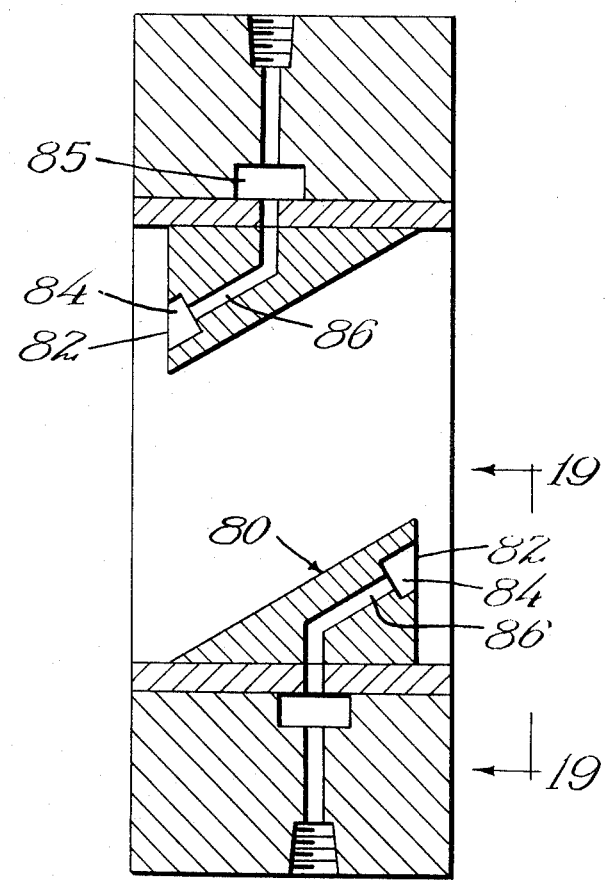
FIG. 18 is a section of a modified form of ring meter illustrating a slot-type opening in the forms communicating with an average chamber.
Figure 19:
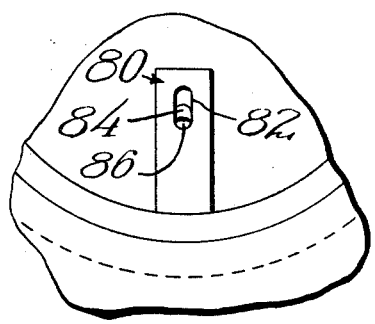
FIG. 19 is a partial plan view along lines 19–19 of FIG. 18 of the modified form.

FIG. 18 is a view of a modified ramp or form 80 having a slot opening 82 in the face of the ramp, (the slot 82 extending and opening into a chamber 84) from which a tap 86 extends. The tap may be connected to an averaging chamber 85 similar to the averaging chamber previously described. The chamber 84 is of substantially greater size than the slot opening 82 as is apparent. The slot opening increases the likelihood of the opening being in the flow pattern above the boundary layer.

In accordance with the Patent Office statutes, I have described the principles of construction and operation of Differential-Pressure-Producing Flow Meter, and while I have endeavored to set forth the best embodiment thereof, I desire to have it understood that changes may be made within the scope of the accompanying claims without departing from the spirit of my invention.

What I claim is:

1. A device for sensing different pressures in a fluid flow line comprising:

a. a body having a substantially uniform interior surface substantially contiguous with the interior surface of said line;
b. high-pressure-sensing means comprising a tap communicating with the fluid flowing in said line for sensing high pressure; and
c. low-pressure-sensing means comprising, a nonstreamlined blunt form having sharp edges extending inwardly from the interior surface of said body facing into the axial fluid flow to shear said fluid and create a wake with a quiescent region in part bounded by said wake and said form, and a tap communicating with said region for sensing low pressure.

2. The invention of claim 1 wherein said high-pressure means comprises a static tap in the wall of said body communicating with the interior of said line.

3. The invention of claim 1 wherein said high-pressure means comprises an impact tap.

4. The invention of claim 3 wherein said impact tap is mounted in a form extending inwardly from the internal surface of said body.

5. The invention of claim 4 wherein the opening of said impact tap faces in part into the axial flow of fluid through said line.

6. The invention of claim 5 wherein said line is cylindrical and the opening of said impact tap is spaced from the internal surface of said body about 20—25 percent of the radius of said line.

7. The invention of claim 5 wherein the form having the high-pressure tap therein is triangular in profile and the hypotenuse of said triangular form extends from the internal surface of said body downstream to the innermost end thereof.

8. The invention of claim 7 wherein the surface forming said hypotenuse is substantially a rectangle.

9. The invention of claim 1 wherein said high-pressure-sensing means comprises a plurality of forms each having a tap extending into said line.

10. The invention of claim 9 wherein each of said forms is triangular in profile and the hypotenuse of said triangular forms extends from the internal surface of said body upstream to the inner most end thereof.

11. The invention of claim 10 wherein the triangular forms are foreshortened by a step portion lying upstream of the hypotenuse and the tap therein opens onto the axially positioned portion of said step.

12. The invention of claim 10 wherein said triangular forms extend axially from the body.

13. The invention of claim 1 wherein said low-pressure-sensing tap is disposed in said form.

14. The invention of claim 1 wherein said blunt form has a substantially triangular profile and the hypotenuse of said form extends from the interior surface of said body downstream to the innermost end thereof.

15. The invention of clam 14 wherein the surface forming said hypotenuse is substantially a rectangle.

16. The invention of claim 14 wherein the triangular form is foreshortened by a step portion lying downstream of the hypotenuse and the low-pressure-sensing tap is disposed therein and opens onto the axially positioned portion of said step.

17. The invention of claim 14 wherein said triangular form extends axially from the body and said low-pressure-sensing tap is disposed therein.

18. The invention of claim 1 wherein said blunt form of said low-pressure means has a substantially triangular profile and the hypotenuse of said form extends from the interior surface of said body upstream to the innermost end thereof.

19. The invention of claim 1 wherein said low-pressure means comprises a plurality of said blunt forms and associated taps.

20. The invention of claim 1 wherein said high-pressure-sensing means comprises a plurality of forms extending inwardly from the interior surface of said body, each of said forms having an impact tap therein, and said low-pressure-sensing means comprises a plurality of blunt forms, each of said blunt forms having a low-pressure-sensing tap therein, all of the forms being axially coextensive.

21. The invention of claim 1 wherein said high-pressure-sensing means comprises at least one form having sharp edges extending inwardly from the interior surface of said body facing into the axial flow of said fluid to shear said fluid, said sharp edges defining a plane surface, said form including a high-pressure tap opening in said plane surface facing said flow; and said low-pressure-sensing means comprises at least one nonstreamlined blunt form having sharp edges extending inwardly from the interior surface of said body facing into the axial flow of said fluid to shear said fluid and create a wake as aforesaid, said form having a plane sloping surface extending from the interior surface of said body upstream to the inner most end thereof, and having a low-pressure tap opening in said sloping planar surface.